United States Patent
Rink et al.

(10) Patent No.: US 10,855,645 B2
(45) Date of Patent: Dec. 1, 2020

(54) EPC NODE SELECTION USING CUSTOM SERVICE TYPES

(71) Applicant: Affirmed Networks Communications Technologies, Inc., Acton, MA (US)

(72) Inventors: Fred Rink, Fairview, TX (US); Haibo Qian, Plano, TX (US); Michael Brown, McKinney, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/593,178

(22) Filed: Jan. 9, 2015

(65) Prior Publication Data
US 2016/0205545 A1    Jul. 14, 2016

(51) Int. Cl.
*H04W 4/00* (2018.01)
*H04L 29/12* (2006.01)
*H04W 48/18* (2009.01)
*H04W 76/12* (2018.01)
*H04W 92/14* (2009.01)
*H04W 88/18* (2009.01)

(52) U.S. Cl.
CPC ........ *H04L 61/1511* (2013.01); *H04L 61/305* (2013.01); *H04W 48/18* (2013.01); *H04W 76/12* (2018.02); *H04W 88/18* (2013.01); *H04W 92/14* (2013.01)

(58) Field of Classification Search
None
See application file for complete search history.

(56) References Cited

U.S. PATENT DOCUMENTS

| | | |
|---|---|---|
| 7,346,840 B1 | 3/2008 | Ravishankar et al. |
| 7,466,694 B2 | 12/2008 | Xu et al. |
| 7,734,746 B2 | 6/2010 | Ng et al. |
| 8,428,610 B2 | 4/2013 | Chowdhury et al. |
| 8,477,730 B2 | 7/2013 | Rajagopalan et al. |
| 8,509,200 B2 | 8/2013 | Li et al. |
| 8,522,241 B1 | 8/2013 | Vohra et al. |
| 8,565,070 B2 | 10/2013 | Harper et al. |
| 8,787,875 B2 | 7/2014 | Ahmed et al. |
| 8,855,051 B2 | 10/2014 | Suh et al. |
| 8,995,262 B2 | 3/2015 | Chowdhury et al. |

(Continued)

FOREIGN PATENT DOCUMENTS

| | | |
|---|---|---|
| CN | 101093590 A | 12/2007 |
| CN | 102390184 A | 3/2012 |

(Continued)

OTHER PUBLICATIONS

US 10,505,788 B1, 12/2019, Mills et al. (withdrawn)

(Continued)

*Primary Examiner* — Bob A Phunkulh
(74) *Attorney, Agent, or Firm* — Ray Quinney & Nebeker, P.C.; Thomas M. Hardman; Sunah K. Lee

(57) ABSTRACT

Example implementations described herein are directed to providing one or more service tags in a Domain name service (DNS) response to indicate the availability of user defined services for a particular peer node in an Evolved Packet Core (EPC). DNS clients can process the DNS response for the service tags and facilitate the selection of peer nodes for a User Equipment (UE) based on the processed service tag(s).

21 Claims, 14 Drawing Sheets

Peer Node Information 1401 | 3GPP Defined Services 1402 | Service Tag 1404

User Defined Strings 1403

(56) References Cited

U.S. PATENT DOCUMENTS

| | | |
|---|---|---|
| 9,013,993 B2 | 4/2015 | Logan et al. |
| 9,185,595 B2 | 11/2015 | Qu |
| 9,294,981 B2 | 3/2016 | Rajagopalan et al. |
| 9,300,623 B1* | 3/2016 | Earl ................... H04L 61/1511 |
| 9,578,541 B2 | 2/2017 | Seenappa et al. |
| 9,961,624 B1 | 5/2018 | Zait |
| 9,985,875 B1 | 5/2018 | Srinath et al. |
| 10,484,844 B2 | 11/2019 | Sudarsan et al. |
| 10,536,326 B2 | 1/2020 | Mills et al. |
| 10,616,100 B2 | 4/2020 | Garg et al. |
| 2002/0007468 A1 | 1/2002 | Kampe et al. |
| 2002/0023048 A1 | 2/2002 | Buhannic et al. |
| 2002/0062388 A1 | 5/2002 | Ogier et al. |
| 2003/0171114 A1 | 9/2003 | Hastings |
| 2003/0187982 A1 | 10/2003 | Petit |
| 2004/0131023 A1 | 7/2004 | Auterinen |
| 2004/0181538 A1 | 9/2004 | Lo et al. |
| 2004/0193763 A1 | 9/2004 | Iizuka et al. |
| 2004/0267758 A1 | 12/2004 | Katsurashima |
| 2005/0120240 A1 | 6/2005 | Kiwimagi et al. |
| 2005/0136832 A1 | 6/2005 | Spreizer |
| 2006/0008063 A1 | 1/2006 | Harnesk et al. |
| 2006/0013191 A1 | 1/2006 | Kavanagh |
| 2006/0114832 A1 | 6/2006 | Hamilton et al. |
| 2006/0168655 A1 | 7/2006 | Grandmaitre et al. |
| 2006/0195607 A1 | 8/2006 | Naseh et al. |
| 2006/0288404 A1 | 12/2006 | Kirshnan et al. |
| 2006/0294238 A1 | 12/2006 | Naik et al. |
| 2007/0101377 A1 | 5/2007 | Six et al. |
| 2007/0168058 A1 | 7/2007 | Kephart et al. |
| 2007/0297400 A1 | 12/2007 | Cameron et al. |
| 2008/0014961 A1 | 1/2008 | Lipps et al. |
| 2008/0077465 A1 | 3/2008 | Schimpf et al. |
| 2008/0162984 A1 | 7/2008 | Kalra et al. |
| 2008/0240082 A1 | 10/2008 | Feldman et al. |
| 2009/0042537 A1 | 2/2009 | Gelbman et al. |
| 2009/0109845 A1 | 4/2009 | Andreasen et al. |
| 2009/0124284 A1 | 5/2009 | Scherzer et al. |
| 2009/0300173 A1 | 12/2009 | Bakman et al. |
| 2010/0035587 A1 | 2/2010 | Bennett |
| 2010/0050172 A1 | 2/2010 | Ferris |
| 2010/0066804 A1 | 3/2010 | Shoemake et al. |
| 2010/0128708 A1 | 5/2010 | Liu et al. |
| 2010/0188975 A1 | 7/2010 | Raleigh |
| 2010/0238840 A1 | 9/2010 | Lu et al. |
| 2010/0250751 A1 | 9/2010 | Leggette et al. |
| 2010/0281151 A1* | 11/2010 | Ramankutty ......... G06F 15/173 709/223 |
| 2010/0317331 A1 | 12/2010 | Miller |
| 2011/0075675 A1 | 3/2011 | Koodli et al. |
| 2011/0131338 A1 | 6/2011 | Hu |
| 2011/0211583 A1 | 9/2011 | Seetharaman et al. |
| 2011/0235505 A1 | 9/2011 | Eswara et al. |
| 2011/0258433 A1 | 10/2011 | Pulini et al. |
| 2011/0269499 A1 | 11/2011 | Vikberg et al. |
| 2011/0296232 A1 | 12/2011 | Izawa |
| 2011/0299386 A1 | 12/2011 | Negoto et al. |
| 2012/0023360 A1 | 1/2012 | Chang et al. |
| 2012/0030349 A1 | 2/2012 | Sugai |
| 2012/0084449 A1 | 4/2012 | Delos Reyes et al. |
| 2012/0106349 A1 | 5/2012 | Adjakple et al. |
| 2012/0131647 A1 | 5/2012 | Lan et al. |
| 2012/0143923 A1 | 6/2012 | Whitney et al. |
| 2012/0144226 A1* | 6/2012 | Yang ................... H04L 41/5038 714/2 |
| 2012/0177005 A1* | 7/2012 | Liang ................... H04W 8/02 370/331 |
| 2012/0190331 A1 | 7/2012 | Ahmed et al. |
| 2012/0207104 A1* | 8/2012 | Liang ................... H04W 48/20 370/329 |
| 2012/0236708 A1 | 9/2012 | Kompella et al. |
| 2012/0282937 A1 | 11/2012 | He et al. |
| 2013/0007286 A1 | 1/2013 | Mehta et al. |
| 2013/0010756 A1* | 1/2013 | Liang ................... H04W 36/18 370/331 |
| 2013/0054789 A1 | 2/2013 | Bajamahal |
| 2013/0094395 A1* | 4/2013 | Lopez ................ H04L 29/12066 370/254 |
| 2013/0100815 A1* | 4/2013 | Kakadia ................ H04W 40/00 370/237 |
| 2013/0121298 A1* | 5/2013 | Rune ................ H04L 29/12066 370/329 |
| 2013/0173804 A1 | 7/2013 | Murthy et al. |
| 2013/0188555 A1 | 7/2013 | Olsson et al. |
| 2013/0212205 A1 | 8/2013 | Flockhart et al. |
| 2013/0231080 A1 | 9/2013 | Cheuk et al. |
| 2013/0286821 A1* | 10/2013 | Liu ................... H04W 88/16 370/225 |
| 2013/0308604 A1* | 11/2013 | Jiang ................... H04W 48/20 370/331 |
| 2014/0047282 A1 | 2/2014 | Deb et al. |
| 2014/0098671 A1 | 4/2014 | Raleigh et al. |
| 2014/0133464 A1 | 5/2014 | Li et al. |
| 2014/0148165 A1 | 5/2014 | Serravalle et al. |
| 2014/0160938 A1 | 6/2014 | Qu |
| 2014/0221025 A1 | 8/2014 | Chandramouli et al. |
| 2014/0241174 A1 | 8/2014 | Harris et al. |
| 2014/0359041 A1* | 12/2014 | Bai ................... H04L 61/6013 709/207 |
| 2015/0018131 A1 | 1/2015 | Siefker |
| 2015/0050924 A1 | 2/2015 | Gotou |
| 2015/0181431 A1* | 6/2015 | Zheng ................... H04W 12/08 726/3 |
| 2015/0201364 A1* | 7/2015 | Yamada ................ H04W 88/16 370/235 |
| 2015/0215768 A1 | 7/2015 | Dong et al. |
| 2015/0237539 A1 | 8/2015 | Guo |
| 2015/0271255 A1 | 9/2015 | Mackay et al. |
| 2015/0280927 A1* | 10/2015 | Liang ................... H04L 45/38 370/259 |
| 2015/0281466 A1 | 10/2015 | Guo et al. |
| 2015/0334615 A1 | 11/2015 | Zhang et al. |
| 2016/0028607 A1* | 1/2016 | Weill ................... H04L 43/12 709/224 |
| 2016/0029047 A1 | 1/2016 | Spidella et al. |
| 2016/0029278 A1 | 1/2016 | Poikonen et al. |
| 2016/0135143 A1 | 5/2016 | Won et al. |
| 2016/0270142 A1* | 9/2016 | Olsson ............... H04W 36/0083 |
| 2016/0285923 A1 | 9/2016 | Kodaypak |
| 2016/0286385 A1 | 9/2016 | Ryu et al. |
| 2016/0337841 A1 | 11/2016 | Won et al. |
| 2016/0353325 A1* | 12/2016 | Poikonen ............ H04L 41/0246 |
| 2017/0054595 A1 | 2/2017 | Zhang et al. |
| 2017/0127324 A1* | 5/2017 | Liang ................... H04W 36/08 |
| 2017/0142762 A1 | 5/2017 | Kedalagudde et al. |
| 2017/0206115 A1 | 7/2017 | Shimojou et al. |
| 2017/0257810 A1 | 9/2017 | Gandhi |
| 2017/0318450 A1 | 11/2017 | Salkintzis |
| 2017/0332421 A1 | 11/2017 | Sternberg et al. |
| 2018/0049156 A1 | 2/2018 | Laha et al. |
| 2018/0077714 A1 | 3/2018 | Kodaypak et al. |
| 2018/0139797 A1 | 5/2018 | Chun et al. |
| 2018/0192234 A1 | 7/2018 | Mohamed et al. |
| 2018/0241793 A1 | 8/2018 | Dellosa |
| 2018/0248711 A1 | 8/2018 | McCann |
| 2018/0270710 A1 | 9/2018 | Hua et al. |
| 2018/0279115 A1 | 9/2018 | Tanna |
| 2018/0332636 A1 | 11/2018 | Lu et al. |
| 2018/0343601 A1 | 11/2018 | Livanos |
| 2018/0358337 A1 | 12/2018 | Maki |
| 2018/0359337 A1 | 12/2018 | Kodaypak et al. |
| 2018/0368202 A1 | 12/2018 | Landais et al. |
| 2019/0007899 A1 | 1/2019 | Vrzic et al. |
| 2019/0028866 A1 | 1/2019 | Baek et al. |
| 2019/0037441 A1 | 1/2019 | Liu et al. |
| 2019/0104503 A1 | 4/2019 | Niu et al. |
| 2019/0116097 A1 | 4/2019 | Shimojou et al. |
| 2019/0124572 A1 | 4/2019 | Park et al. |
| 2019/0166644 A1 | 5/2019 | Shaw et al. |
| 2019/0190784 A1 | 6/2019 | Shimojou et al. |
| 2019/0215235 A1 | 7/2019 | Chou et al. |

(56) References Cited

U.S. PATENT DOCUMENTS

| | | |
|---|---|---|
| 2019/0253962 A1 | 8/2019 | Kiessling et al. |
| 2019/0261233 A1 | 8/2019 | Duan et al. |
| 2019/0289622 A1 | 9/2019 | Chatterjee et al. |
| 2019/0313216 A1 | 10/2019 | Wong et al. |
| 2019/0313254 A1 | 10/2019 | Zaks |
| 2019/0320332 A1 | 10/2019 | Halabian et al. |
| 2020/0022074 A1 | 1/2020 | Shimojou et al. |
| 2020/0028896 A1 | 1/2020 | Veldanda et al. |
| 2020/0029273 A1 | 1/2020 | Shimojou et al. |
| 2020/0077432 A1 | 3/2020 | Xiong et al. |
| 2020/0089589 A1 | 3/2020 | Chou et al. |
| 2020/0112861 A1 | 4/2020 | Yao et al. |
| 2020/0178139 A1 | 6/2020 | Shimojou et al. |

FOREIGN PATENT DOCUMENTS

| | | |
|---|---|---|
| CN | 102555536 A | 7/2012 |
| CN | 202965525 U | 6/2013 |
| CN | 103404181 A | 11/2013 |
| CN | 203311505 U | 11/2013 |
| CN | 104363572 A | 2/2015 |
| CN | 103348335 B | 7/2016 |
| EP | 1011974 A1 | 6/2000 |
| EP | 1518352 A1 | 3/2005 |
| EP | 1518352 B1 | 8/2007 |
| EP | 2200369 A2 | 6/2010 |
| EP | 2709385 A1 | 3/2014 |
| GB | 2409368 A | 6/2005 |
| JP | 2002-319963 A | 10/2002 |
| JP | 2006-501781 A | 1/2006 |
| JP | 2009-522933 A | 6/2009 |
| JP | 2010-88013 | 4/2010 |
| JP | 2010-141555 A | 6/2010 |
| JP | 2011-508474 A | 3/2011 |
| JP | 2011-259440 A | 12/2011 |
| KR | 10-2010-0070691 A | 6/2010 |
| WO | WO-2004004216 A1 | 1/2004 |
| WO | WO-2007081727 A2 | 7/2007 |
| WO | WO-2009107117 A2 | 9/2009 |
| WO | WO-2010066430 A1 | 6/2010 |
| WO | WO-2013143831 A1 | 10/2013 |
| WO | WO-2013177693 | 12/2013 |
| WO | WO-2016206118 A1 | 12/2016 |
| WO | WO-2017004158 A1 | 1/2017 |
| WO | WO-2017076088 A1 | 5/2017 |
| WO | WO-2017197589 A1 | 11/2017 |
| WO | WO-2018222838 | 12/2018 |
| WO | WO-2020023511 A1 | 1/2020 |

OTHER PUBLICATIONS

3GPP TS 25.401 V 12.0.0, Release 12 "Universal Mobile Telecommunications System (UMTS); UTRAN overall description" Oct. 2014.*
Extended European Search Report issued by the European Patent Office for European Patent Application No. 12825827.4 dated Mar. 6, 2015 (7 pages).
Horak, R., Excerpt from "Internet Protocols", in Telecommunications and Data Communications Handbook, John Wiley & Sons, pp. 663-664, Aug. 2007 (2 pages).
International Search Report and Written Opinion issued by the U.S. Patent and Trademark Office as International Searching Authority for International Application No. PCT/US12/21520 dated May 8, 2012 (8 pages).
International Search Report and Written Opinion issued by the U.S. Patent and Trademark Office as International Searching Authority for International Patent Application No. PCT/US16/21744 dated Jun. 9, 2016 (6 pages).
3GPP TR 21.905 v13.1.0 (Jun. 2016), "3rd Generation Partnership Project; Technical Specification Group Services and System Aspects; Vocabulary for 3GPP Specifications (Release 13)", Valbonne, France, Jun. 2016 (65 pages).
3GPP TR 21.905 v15.0.0 (Mar. 2018), "3rd Generation Partnership Project; Technical Specification Group Services and System Aspects; Vocabulary for 3GPP Specifications (Release 15)", Valbonne, France, Mar. 2018 (65 pages).
3GPP TR 23.714 V.14.0.0, "3rd Generation Partnership Project; Technical Specification Group Services and System Aspects; Study on Control and User Plane Separation of EPC Nodes (Release 14)"; Valbonne, France, Jun. 2016 (87 pages).
3GPP TR 23.722 v0.1.1 (Apr. 2017), "3rd Generation Partnership Project; Technical Specification Group Services and System Aspects; Study on Common API Framework for 3GPP Northbound APIs (Release 15)", Valbonne, France, Apr. 2017 (20 pages).
3GPP TS 23.040 v13.2.0 (Sep. 2016), "3rd Generation Partnership Project; Technical Specification Group Core Network and Terminals; Technical Realization of the Short Message Service (SMS) (Release 13)", Valbonne, France, Sep. 2016 (214 pages).
3GPP TS 23.204 v13.1.0 (Jun. 2016), "3rd Generation Partnership Project; Technical Specification Group Services and Systems Aspects; Support of Short Message Service (SMS) over Generic 3GPP Internet Protocol (IP) Access; Stage 2 (Release 13)", Valbonne, France, Jun. 2016 (59 pages).
3GPP TS 23.214 V14.5.0, "3rd Generation Partnership Project; Technical Specification Group Services and System Aspects; Architecture enhancements for control and user plane separation of EPC nodes; Stage 2 (Release 14)", Valbonne, France, Dec. 2017 (84 pages).
3GPP TS 23.236 v12.0.0 (Jun. 2013); "3rd Generation Partnership Project; Technical Specification Group Services and System Aspects; Intra-domain connection of Radio Access Network (RAN) nodes to multiple Core Network (CN) nodes (Release 12)", 3GPP Organizational Partners, Valbonne, France, Jun. 2013 (40 pages).
3GPP TS 23.236 v13.0.0 (Jun. 2015); "3rd Generation Partnership Project; Technical Specification Group Services and System Aspects; Intra-domain connection of Radio Access Network (RAN) nodes to multiple Core Network (CN) nodes (Release 13)", 3GPP Organizational Partners, Valbonne, France, Jun. 2015 (41 pages).
3GPP TS 23.401 V13.9.0 (Dec. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).
3GPP TS 23.401v13.5.0 (Dec. 2015), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne France, Dec. 2015 (337 pages).
3GPP TS 23.682 v. 15.5.0 (Jun. 2018),"3rd Generation Partnership Project; Technical Specification Group Services and System Aspects; Architecture Enhancements to Facilitate Communications with Packet Data Networks and Applications (Release 15)", Valbonne, France, Jun. 2018 (125 pages).
3GPP TS 23.682 v.13.11.0 (Jun. 2018); "3rd Generation Partnership Project; Technical Specification Group Services and System Aspects; Architecture Enhancements to Facilitate Communications with Packet Data Networks and Applications (Release 13)"; Valbonne, France, Jun. 2018 (93 pages).
3GPP TS 23.682 v13.9.0 (Jun. 2017), "3rd Generation Partnership Project; Technical Specification Group Services and System Aspect; Architecture enhancements to facilitate communications with packet data networks and applications (Release 13)", Valbonne, France, Jun. 2017 (93 pages).
3GPP TS 23.682 v14.3.0, "3rd Generation Partnership Project; Technical Specification Group Services and System Aspects; Architecture enhancements to facilitate communications with packet data networks and applications (Release 14)", Valbonne, France, Mar. 2017 (106 pages).
3GPP TS 29.128 v13.3.0 (Dec. 2016), "3rd Generation Partnership Project; Technical Specification Group Core Network and Terminals; Mobility Management Entity (MME) and Serving GPRS

(56) References Cited

OTHER PUBLICATIONS

Support Node (SGSN) Interfaces for Interworking with Packet Data Networks and Applications (Release 13)", Valbonne, France, Dec. 2016 (47 pages).

3GPP TS 29.338 v13.3.0 (Dec. 2016), "3rd Generation Partnership Project; Technical Specification Group Core Network and Terminals; Diameter Based Protocols to Support Short Message Service (SMS) Capable Mobile Management Entities (MMEs) (Release 13)", Valbonne, France, Dec. 2016 (50 pages).

Apple, 3GPP Draft, "A solution of network slice instance selection and association", Temporary Document, SA WG2 Meeting #S2-116BIS, S2-165127, Aug. 29-Sep. 2, 2016, Sanya, P.R China, Sep. 2016 (5 pages).

Cisco Systems, "Deployment Guide: Cisco IOS IPSEC High Availability", 2005, accessed http://www.cisco.com/en/US/technologies/tk583/tk372/technologies_white_paper0900aecd80278edf.pdf, retrieved Jul. 26, 2018 (16 pages).

European Extended Search Report issued in EP16882635.2. dated Jul. 17, 2019 (13 pages).

Giust, F. et al., "ETSI: MEC Deployments in 4G and Evolution Towards 5G", ETSI White Paper No. 24, First Edition, ISBN No. 979-10-92620-18-4, Feb. 2018 (24 pages).

International Search Report and Written Opinion issued by the European Patent Office as International Searching Authority in International Application No. PCT/US2018/035345, dated Aug. 13, 2018 (19 pages).

International Search Report and Written Opinion issued by the European Patent Office as International Searching Authority in International Application No. PCT/US2018/031423, dated Oct. 9, 2018 (18 pages).

International Search Report and Written Opinion issued by the European Patent Office as International Searching Authority in International Application No. PCT/US2019/018666, dated Jul. 10, 2019 (26 pages).

International Search Report and Written Opinion issued by the European Patent Office as International Searching Authority, issued in International Application No. PCT/US19/23138, dated May 29, 2019 (16 pages).

International Search Report and Written Opinion issued by the U.S. Patent and Trademark Office as International Searching Authority, received for PCT Patent Application No. PCT/US12/25577, dated May 21, 2012, 7 pages.

International Search Report and Written Opinion issued by the U.S. Patent and Trademark Office as Searching Authority, issued in International Application PCT/US16/69092, dated Mar. 29, 2017 (15 pages).

International Search Report and Written Report issued by the U.S. Patent and Trademark Office as International Searching Authority, issued in PCT/US17/017913, dated Mar. 13, 2017 (14 pages).

Rodriguez, et al., "A 3GPP System Architecture Evolution Virtualized Experimentation Infrastructure for Mobility Prototyping (Invited Paper)", Proceedings of the 4th International Conference on Testbeds and Research Infrastructure for the Development of Networks & Communities (Tridentcom), Mar. 18, 2008 (10 Pages).

Taniguchi, et al., "Implementation and Evaluation of Cooperative Proxy Caching System for Video Streaming Services", Technical Report of the Institute of Electronics Information and Communication Engineers, IEICE, Japan, vol. 103(650):13-18, Feb. 5, 2004—English Abstract.

Hakala, H. et al., "Diameter Credit-Control Application, RFC 4006", Network Working Group, Standards Track, http://tools.ietf.org/html/rfc4006, pp. 1-11, 55-57, 69, 71-75, Aug. 2005 (20 pages).

International Search Report and Written Opinion as issued by the U.S. Patent and Trademark office as International Search authority, received for PCT Patent Application No. PCT/US2011/055183, dated Mar. 8, 2012 (9 pages).

International Search Report and Written Opinion issued by the European Patent Office as International Searching Authority for International Application No. PCT/US19/43037, dated Oct. 29, 2019 (14 pages).

Extended European Search Report issued in European Patent Application No. 16762501.1, dated Oct. 30, 2018 (11 pages).

* cited by examiner

| FQDN | Node Type *1 | Interface/Protocols*2 | Replacement |
|---|---|---|---|
| FQDN1 | x-3gpp-mme | x-s10, x-s11 | MME Node Identifier X |
| FQDN2 | x-3gpp-mme | x-s10, x-s11 | MME Node Identifier Y |
| FQDN3 | x-3gpp-sgw | x-s5-gtp, x-s8-gtp | SGW Node Identifier Z |

FIG. 4

| FQDN | Node Type *1 | Interface/Protocols*2 | Replacement |
|---|---|---|---|
| FQDN1 | x-3gpp-mme | x-s10, x-s11 | MME Node Identifier X |
| FQDN2 | x-3gpp-mme | x-s10, x-s11 | MME Node Identifier Y |
| FQDN3 | x-3gpp-sgw | x-s5-gtp, x-s8-gtp, service-a, service-b | SGW Node Identifier Z |

FIG. 9

EPC NODE SELECTION USING CUSTOM SERVICE TYPES

BACKGROUND

Field

The present disclosure relates generally to wireless systems, and more specifically, to conducting Evolved Packet Core (EPC) Node Selection by using custom service types.

Related Art

In the related art, wireless operators are requiring more control over the selection of the Evolved Packet Core (EPC) Serving Gateway (S-GW) and Packet Data Network (PDN) Gateway (P-GW) assigned to wireless user equipment (UEs).

The 3rd Generation Partnership Project (3GPP) wireless standards define the use of Domain Name Service (DNS) for the dynamic selection of peer nodes. As an example, when the Mobility Management Entity (MME) needs to select an S-GW for a UE that attaches to the network, the MME sends a DNS query to determine the list of S-GW that are suitable for the UE's current point of attachment. Since the DNS S-GW query is based on the UEs location, the DNS server contains an entry for every location deployed by the operator. In the case of Long Term Evolution (LTE), the location is based on the Tracking Area (TA). An operator with thousands of TAs in their network will have just as many DNS entries.

When the operator wants to customize the selection process, outside the scope of what is defined by 3GPP, either local nodal provisioning or custom DNS query strings are used in the related art to augment the existing 3GPP methods. Using the same MME S-GW selection process example, if one of the S-GWs serving a given TA supported a specific service, the operator may want all UEs using that service to be anchored on those specific S-GWs. The only way to realize this selective routing is that the operator either:
  a. Provision local MME configuration that associates a specific feature to a set of S-GWs. The side-effect of this implementation is that the operator now has to maintain peer node information both in DNS and locally.
  b. Modify the DNS query string to include special information to match different DNS entries associated with the special routing. The side-effect of this implementation is that DNS entries must potentially be duplicated for each TA, one entry for the normal S-GW peer nodes, and one entry for the special S-GW nodes supporting a given feature.

In the related art, the provision of such custom behavior can be difficult without requiring local peer node service provisioning or complex DNS configurations.

SUMMARY

Example implementations of the present disclosure are directed to solutions for providing a custom behavior even without requiring either local peer node service provisioning or complicated DNS configuration. In example implementations described herein, the operator can use the existing DNS configuration and add custom 'Service' tag(s) to their DNS entries where a given node supports a specific service. The receiver of the DNS response can then use this 'Service' information to refine which peer nodes to select.

In an example implementation involving the MME S-GW selection example, the operator can define a 'Voice over LTE' (VoLTE) service tag and add this tag to all the S-GW's DNS entries that support the VoLTE service. The MME would then do a DNS query based on the UE location as defined by 3GPP, and when the MME receives the S-GW list response from the DNS server, the MME could identify which S-GWs are capable of supporting the VoLTE service based on presence of the VoLTE tag, and use those VoLTE capable S-GWs when the MME knows the UE is VoLTE capable or wants VoLTE service.

Aspects of the present application may include an apparatus, having a memory configured to store information from one or more Domain name service (DNS) responses, the information including a list of one or more peer nodes and one or more service tags associated with the one or more peer nodes; and a processor, configured to process the stored information for ones of the one or more service tags associated with a selected service; and select a peer node from the one or more peer nodes associated with the ones of the one or more service tags associated with the selected service. The apparatus can be in the form of an EPC such as a SGSN, MME, or other node as described in the present disclosure.

Additional aspects of the present disclosure can include a method, which can involve storing information from one or more Domain name service (DNS) responses, the information comprising a list of one or more peer nodes and one or more service tags associated with the one or more peer nodes; processing the stored information for ones of the one or more service tags associated with a selected service; and selecting a peer node from the one or more peer nodes associated with the ones of the one or more service tags associated with the selected service.

Additional aspects of the present disclosure can include a non-transitory computer readable medium storing instructions for conducting a process. The instructions can include storing information from one or more Domain name service (DNS) responses, the information comprising a list of one or more peer nodes and one or more service tags associated with the one or more peer nodes; processing the stored information for ones of the one or more service tags associated with a selected service; and selecting a peer node from the one or more peer nodes associated with the ones of the one or more service tags associated with the selected service.

BRIEF DESCRIPTION OF DRAWINGS

FIG. 4 illustrates an example DNS entry information table, in accordance with an example implementation.

FIG. 9 illustrates examples of DNS entries, in accordance with an example implementation.

DETAILED DESCRIPTION

Figure 1:
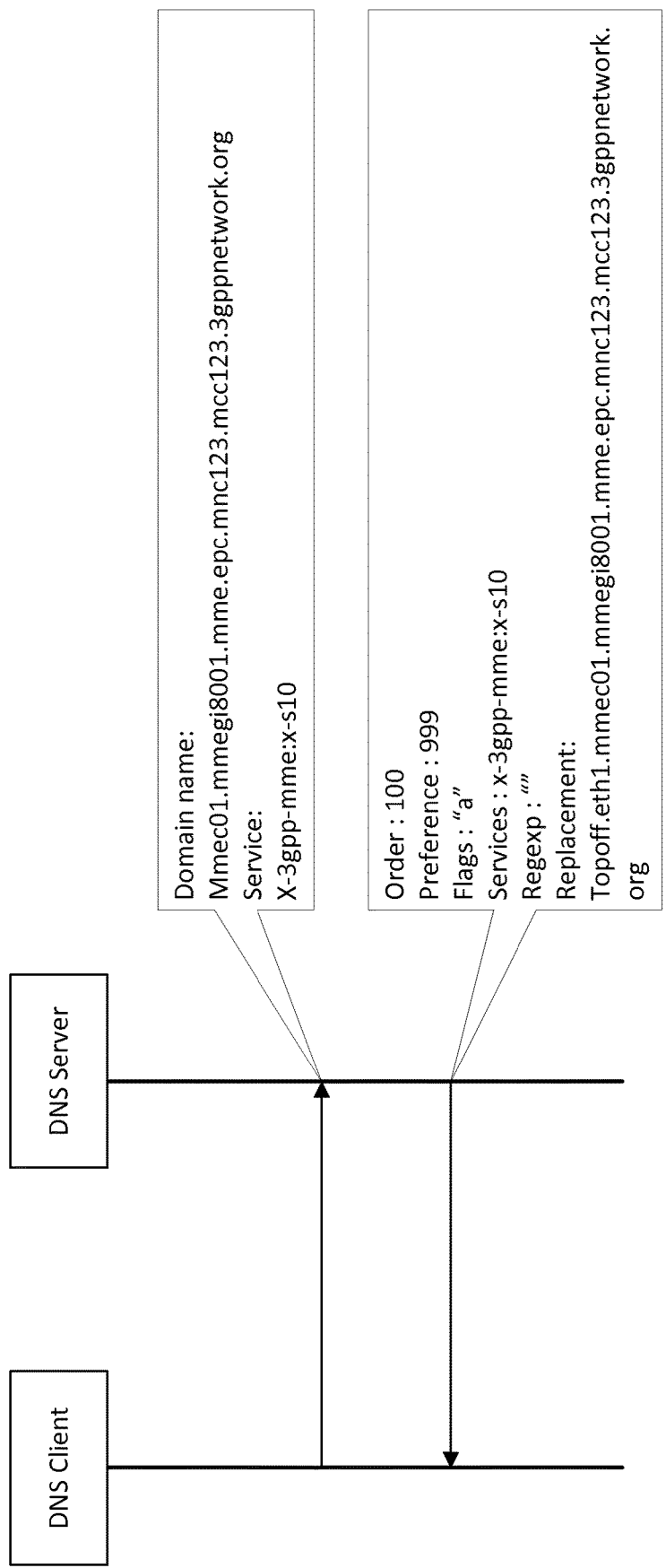
FIG. 1 illustrates a 3GPP defined DNS exchange between a DNS Client and a DNS Server.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

3GPP has defined the use of Domain name service (DNS) to dynamically learn about services and/or capabilities of peer nodes. The MME and Serving General packet radio service Support Node (SGSN) uses DNS to discover peers including the S-GW, P-GW, Gateway General Packet Radio Service (GPRS) Support Node (GGSN), MME, SGSN, and Mobile Switching Center (MSC).

In the related art, operators have implemented proprietary methods for providing further control over peer node selection. Related art proprietary methods can include the modification of the DNS query string to include UE specific information or location information; e.g. insertion of the Charging Characteristics (CC) or Radio Network Controller Identifier (RNC-ID) into the query string. This can complicate the DNS by having to replicate DNS entries for all the special DNS strings that can possibly be sent. The other related art methods involve local provisioning which takes the place of DNS, and can have a drawback of having node selection logic in two locations (locally and in the DNS server).

Operators have used related art custom methods for more advanced selection of peer nodes. However, such custom methods may not be optimal or scalable solutions. Operators may need a generic method to associate a given node with a set of service capabilities, to be used during the node selection process.

In an example use case, there may be GWs with different capability sets. In the example provided an operator chooses to designate specific S-GW for VoLTE sessions due to their high QoS and 3GPP functional requirements. A generic version of this use case is that in an operator's network, not all nodes may be from the same vendor or at the same software release. Example implementations described herein give the operator flexibility in tagging the different nodes based on functionality they support. This is applicable to both the S-GW and P-GW selection.

In another example use case, there may be PGW selection based on UE type. In the related art for UEs using the same Access Point Name (APN), the DNS server will return the same list of candidate PGWs. By using generic Service Tags, different PGWs can be used for different classes of users. The MME/SGSN based on the classification of the UE can filter the candidate PGWs to only include those for that UE's class.

Example implementations of the present disclosure extend the existing DNS query procedures by adding Service Tags (ST) into the DNS server entries to specify optional services that a node may support. Such example implementations can be implemented without additional capabilities required from the DNS server, and can be implemented without requiring any change in the messaging structure. Support of the example implementations can be transparent to the DNS server and the associated messaging to the MME/SGSN.

In example implementations, the MME/SGSN can use the returned Service Tags when selecting the appropriate peer nodes based on local MME/SGSN policy.

3GPP has defined the Domain name service (DNS) based node selection in 3GPP TS 29.303. In technical terms, EPC nodes perform Dynamic Delegation Discovery System (DDDS) procedures using Name Authority Pointer (NAPTR) record and/or Service Record (SVR) resolution to look up appropriate internet protocol (IP) and port information for neighboring nodes.

FIG. 1 illustrates a 3GPP defined DNS exchange between a DNS Client and a DNS Server. In the example provided in FIG. 1, an MME discovers a peer MME for an inter-MME mobility related scenario. In the example of FIG. 1, the DNS Client sends a query containing domain name information and service information. The response from the DNS Server includes information such as order, preference, flags, services, regular expression objects (regexp), and replacement answer.

Figure 2:
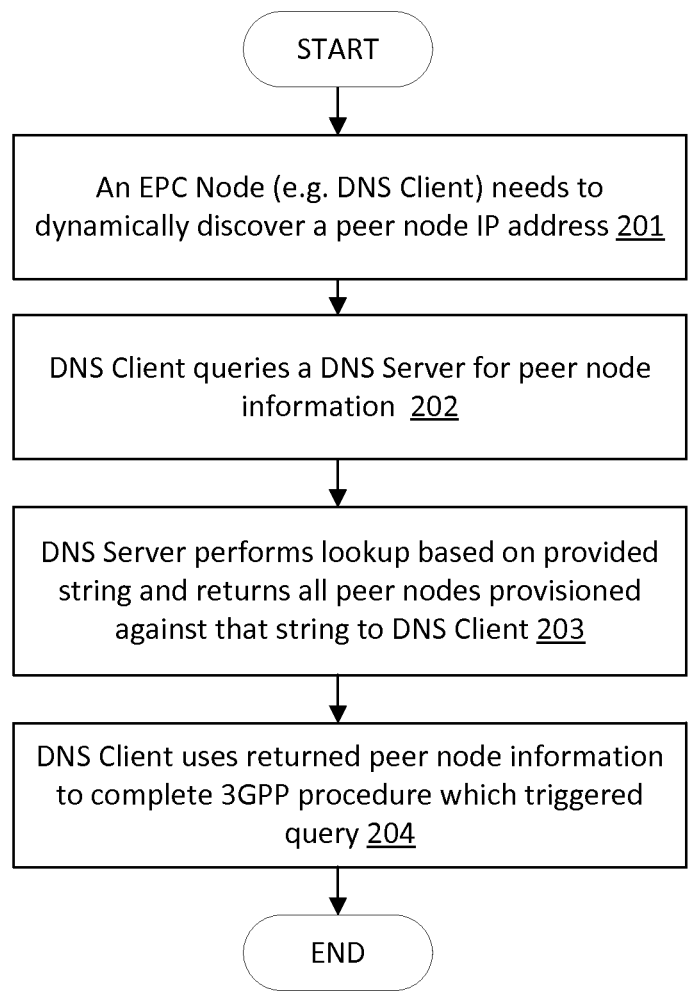
FIG. 2 illustrates the generic flow for the interaction of an EPC node with DNS to dynamically determine the peer node information.

FIG. 2 illustrates the generic flow for the interaction of an EPC node with DNS to dynamically determine the peer node information. 3GPP defines the use of DNS for discovery of peer nodes including, but not limited to, MMEs, SGSNs, S-GW, P-GWs, GGSNs, and MSCs. The framework of FIG. 2 is applied to a 3GPP procedure in FIG. 3 where the MME discovers an S-GW for a UEs current point of attachment to the network.

At 201, an EPC node (e.g. a DNS client) determines a need to dynamically discover a peer node IP address to conduct a 3GPP procedure. Such procedures can include, but are not limited to, discovery of a P-GW to handle a UE that is initially attaching to the wireless network or the discovery of the old MME or SGSN when the UE moves to a coverage area managed by a different MME or SGSN. At 202, the DNS Client queries a DNS server for peer node information by using a 3GPP defined query string. At 203, the DNS server performs a lookup based on the provided string and returns all peer nodes provisioned against that string to DNS Client. At 204 the DNS Client uses returned peer node information to complete 3GPP procedure which triggered query.

Figure 3:
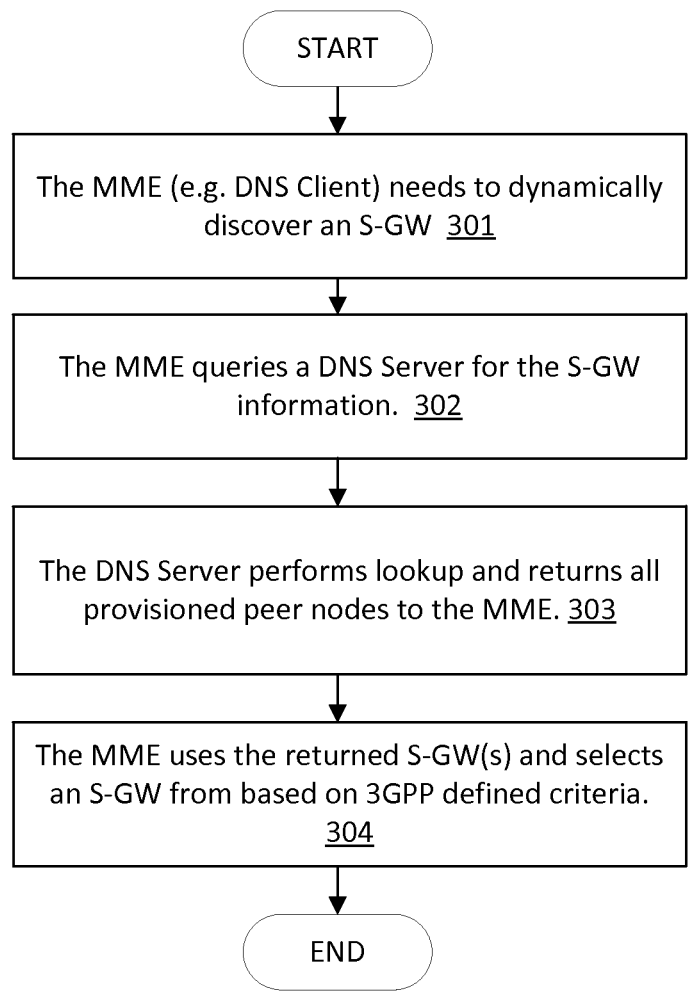
FIG. 3 illustrates the specific flow for MME discovery of peer S-GWs. The MME is responsible for selecting an S-GW to use for a UE's user plane connection.

The framework of FIG. 2 is applied to a 3GPP procedure in FIG. 3 where the MME discovers an S-GW for a UEs current point of attachment to the network. FIG. 3 illustrates the specific flow for MME discovery of peer S-GWs. The MME is responsible for selecting an S-GW to use for a UE's user plane connection. The selection is based on the current location of the UE. 3GPP TS 23.401 defines the procedure flow for when and how the MME selects an S-GW.

Similar to the flow of FIG. 2, at 300, the MME (e.g. DNS Client) needs to dynamically discover an S-GW for, for example, handling the user plane traffic of a UE. At 302, the MME queries a DNS Server for the S-GW information. The DNS query string also includes the UEs location information. At 303, based on the provided location information, the DNS Server performs lookup and returns all peer nodes provisioned against that location to the MME. At 304, the MME uses the returned S-GW(s) and selects an S-GW from based on 3GPP defined criteria.

As illustrated in FIGS. 2 and 3, the 3GPP defined methods for DNS query/response only provides implementations for the DNS client to know what 3GPP interfaces/protocols a node supports. For example, in the case of S-GW, the DNS is configured to identify what interfaces/protocols that S-GW supports which could include x-s5-gtp, x-s5-pmip, x-s8-gtp, x-s8-pmip, x-s11, x-s12, x-s4, x-s1-u, x-s2a-pmip, and x-s2b-pmip. The DNS response information does not provide application level service details a node may or may not support; e.g. whether the S-GW supports VoLTE.

Example implementations of the present disclosure are directed to augmenting the 3GPP defined methods, by implementing the following.
  a. Allowing the operator to configure application level capability and the Service Tag(s) a node supports in the DNS Server. The configurations are provided to the DNS client. This is in-addition to the 3GPP defined protocol/interface strings; e.g. x-3gpp-sgw:x-s8-gtp:x-s11:x-s5-gtp x-3gpp-pgw:x-s5-gtp:x-gn, and so forth.
  b. The receiver of the DNS records is configured to recognize these Service Tags and associate them to specific service handling.
  c. Based on a local policy, the receiver of the DNS records decides if it needs to refine its selection of peer nodes based on the policy; e.g. the operator configures a local policy for VoLTE UEs to enable selection of S-GW(s) that support VoLTE.

Example implementations of the present disclosure utilize the configuring and defining of Service Tags (ST) for application level services that are to be associated with specific nodes. As an example, when the operator wants to deploy VoLTE, and restrict the nodes in the network that will support VoLTE, the ST(s) are configured accordingly. The operator would provision the ST(s) in the DNS Server entries for the nodes that the ST(s) apply.

FIG. 4 illustrates an example DNS entry information table, in accordance with an example implementation. The general information contained in a DNS entry required by 3GPP can include fully qualified domain name (FQDN), node type, interface/protocols, and replacement information. Information under node type can be, for example, based on the IETF RFC 3958 section 6.5 'app-service' name. Information under Interface/Protocols can be, for example, based on the IETF RFC 3958 section 6.5 'app-protocol' name. The table of FIG. 4 is not representative of a complete list, and can include or omit other information depending on the desired implementation.

Figure 5:
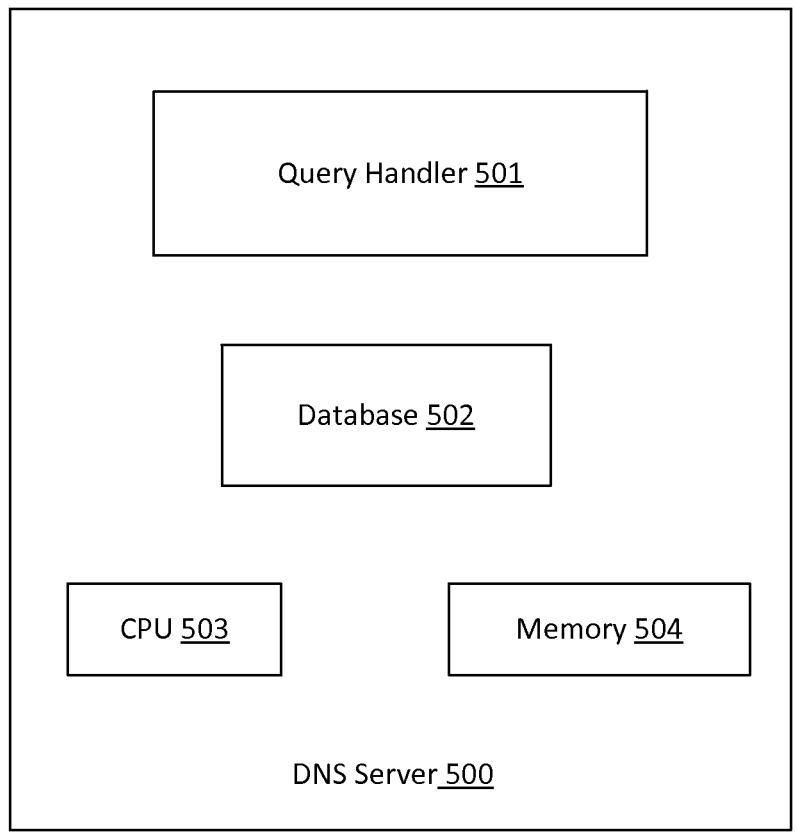
FIG. 5 illustrates a DNS Server, in accordance with an example implementation.
Figure 7:
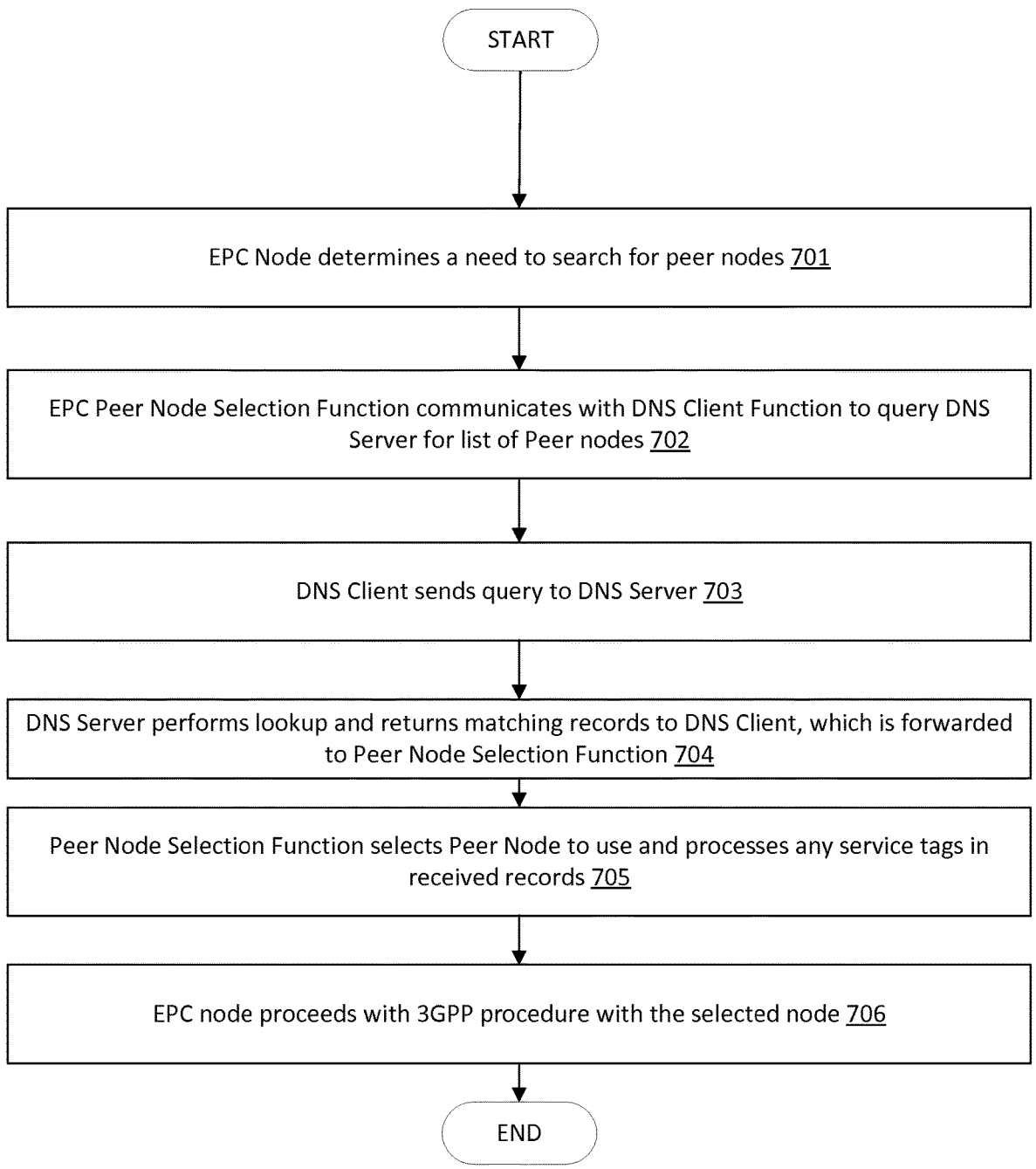
FIG. 7 illustrates a flow diagram for EPC nodal selection, in accordance with an example implementation.
Figure 8:
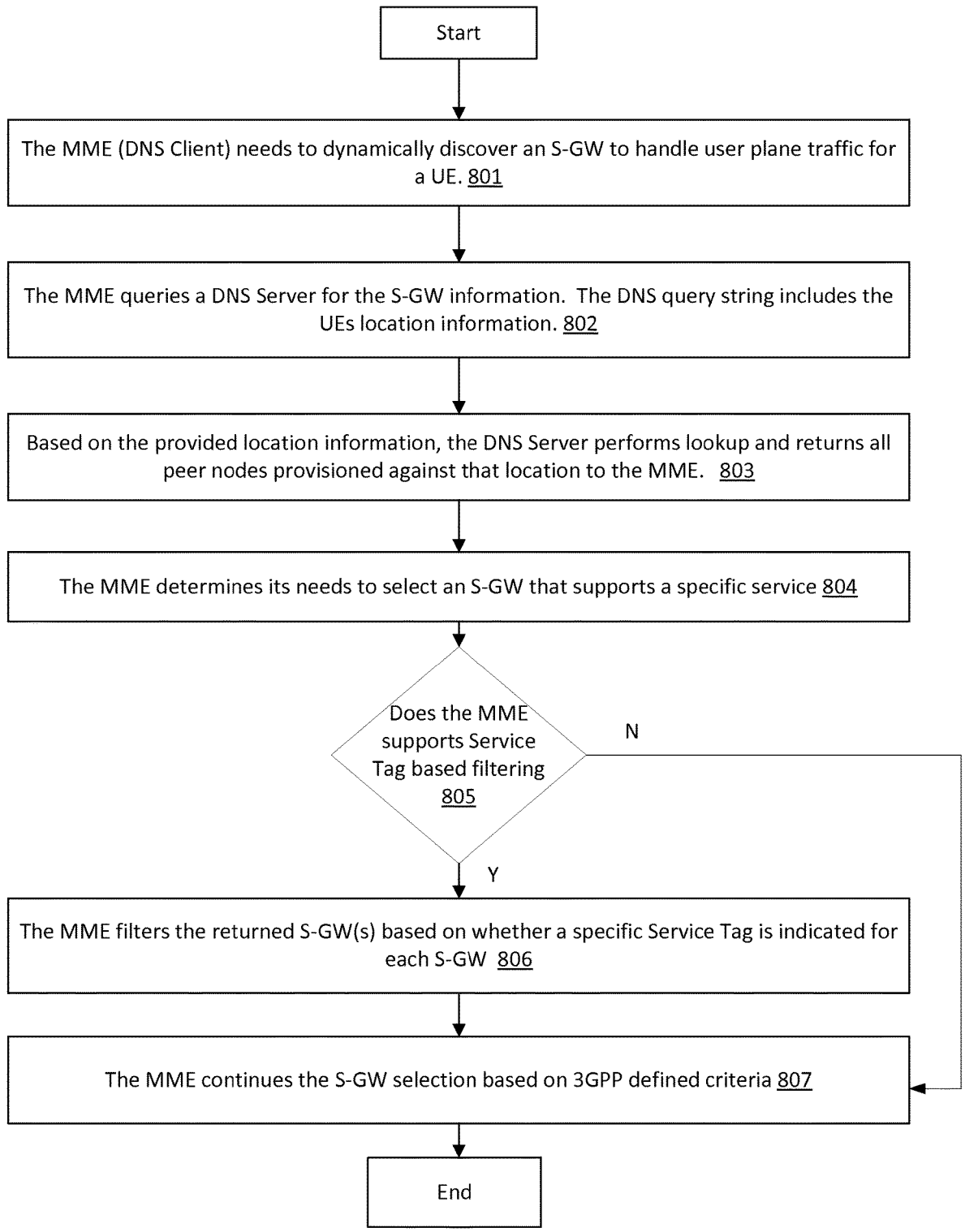
FIG. 8 illustrates a flow diagram for selection of an S-GW for an MME, in accordance with an example implementation.

FIG. 5 illustrates a DNS Server, in accordance with an example implementation. DNS Server 500 can include a Query Handler 501 for processing queries from the DNS clients, a Database 502, a Central Processing Unit (CPU) 503, and a memory 504. The Query Handler 501 may include communications hardware structured to connect the DNS Server to a network for processing queries from DNS clients. The database 502 may be configured to manage peer node information. The CPU 503 may be configured to invoke the flows for the DNS Server as described in the present disclosure as shown in FIGS. 7 and 8. The memory 504 may include computer programs for invoking the flows as described in the present disclosure, and may be configured store information regarding queries from DNS clients as illustrated in FIG. 4. Memory may take the form of a non-transitory computer readable medium such as a computer readable storage medium as described herein.

Figure 6:
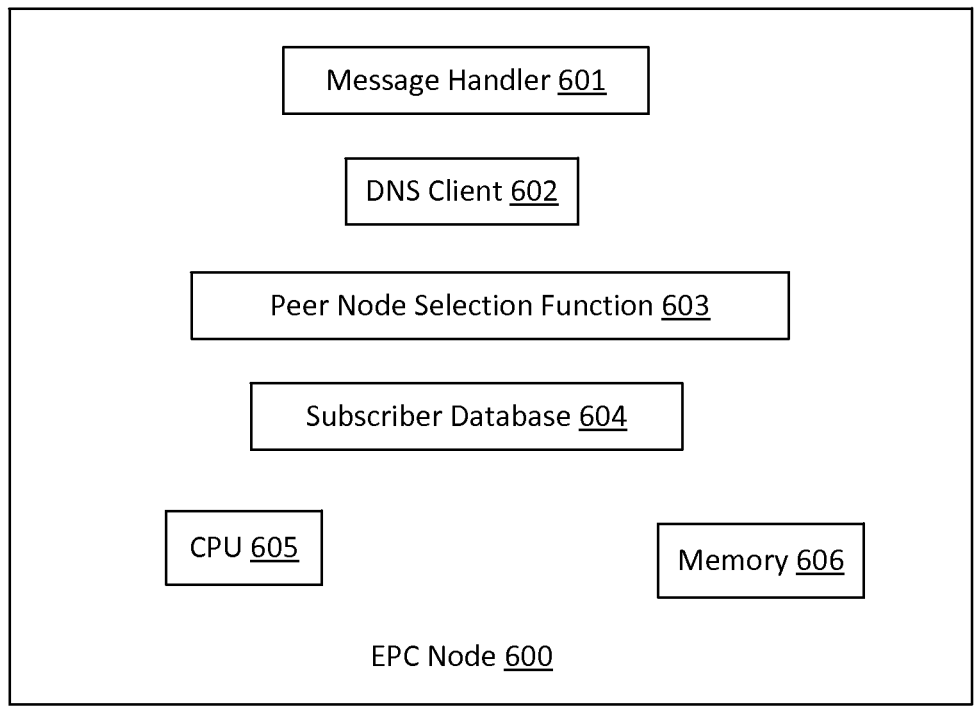
FIG. 6 illustrates an EPC Node, in accordance with an example implementation.

FIG. 6 illustrates an EPC Node, in accordance with an example implementation. The EPC Node 600 may include a Message Handler 601, a DNS Client 602, a Peer Node Selection Function 603, a Subscriber Database 604, a CPU 605 and a Memory 606. The message handler 601 generically identifies process(es) within the node that performs the messaging into and out of the node; which in the present disclosure includes the messaging with the DNS Server. The DNS Client 602 is configured to send queries to and receive responses from the DNS Server over a network. The Peer Node Selection Function 603 represents the logical function within the EPC node that includes the logic of generating the DNS queries, and acting on the DNS responses by select the correct peer node based on defined 3GPP criteria as well as the use of service tags to refine the selection process in the present example implementation. The Subscriber Database 604 is configured to manage one or more user equipment (UE) associated with the EPC Node 600. The CPU 605 and Memory 606 represent the hardware elements, one or more, of the node running the EPC node's software, including the processes represented in 601, 602, 602, and 604. EPC Node may take on the form of any of the peer nodes as described in the present disclosure.

FIG. 7 illustrates a flow diagram for EPC nodal selection, in accordance with an example implementation. At 701, the EPC Node determines a need to search for peer nodes. For example, a UE attaches to a network, and the MME needs to find an S-GW to handle the UE's user-plane connection. At 702, the EPC peer node selection function contacts the DNS client function to query the DNS Server for a list of peer nodes based on a constructed FQDN. For example, the MME builds the FQDN based on the UE location. At 703, the DNS client sends the query to the DNS Server. At 704, the DNS server performs a lookup based on the included FQDN and node type, and returns matching records to the DNS client, which is forwarded to the peer node selection function. The records information may also include one or more STs as needed. At 705, the peer node selection function selects a peer node to use. The peer node selection function may determine if it needs to select the peer based on a required service for a UE based on any existing service tags. If additional service is required, then the returned node list is filtered based on whether it supports that service. For example, a S-GW list may be filtered to only include S-GWs that support VoLTE. The UEs subscription database information may be used to determine if a specific service is required.

FIG. 8 illustrates a flow diagram for selection of an S-GW for an MME, in accordance with an example implementation. At 801, the MME (DNS Client) determines that it needs to dynamically discover an S-GW to handle the user plane traffic for a UE. At 802, the MME queries a DNS server for the S-GW information. The DNS query string can also include the UE location information. At 803, based on the provided location information, the DNS server performs lookup and returns all peer nodes provisioned against that location to the MME. The peer node information may include one or more STs. At 804, The MME determines its needs to select an S-GW that supports a specific service, such as service-a. At 805, a check is conducted to determine if the MME supports ST based filtering. If so (Y), then the flow proceeds to 806, otherwise (N) the flow proceeds to 807.

At 806, because STs are implemented, the MME filters the returned S-GW(s) based on whether a specific Service Tag is indicated for each S-GW (e.g., service-a). At 807, the MME proceeds with the S-GW selection based on 3GPP defined criteria.

FIG. 9 illustrates examples of DNS entries, in accordance with an example implementation. In example implementations the DNS Entries can be updated to include ST(s) as desired for nodes that support specific application level services. Although a specific existing DNS field is not required for including the ST(s), the example implementations can utilize non 3GPP defined service tags in the interface/protocol field. For example, in FIG. 9 the 'SGW Node Identifier Z' supports both ST "service-a" and "service-b".

Figure 10:
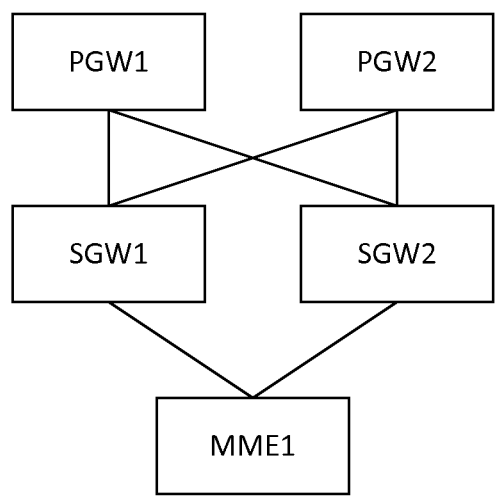
FIG. 10 illustrates an example system, in accordance with an example implementation.

FIG. 10 illustrates an example system, in accordance with an example implementation. In an example system, an MME (MME1) may be associated with P-GW peer nodes (PGW1, PGW2) and S-GW peer nodes (SGW1, SGW2). In this example, MME1 may need to perform peer node selection for an associated UE.

Figure 11:
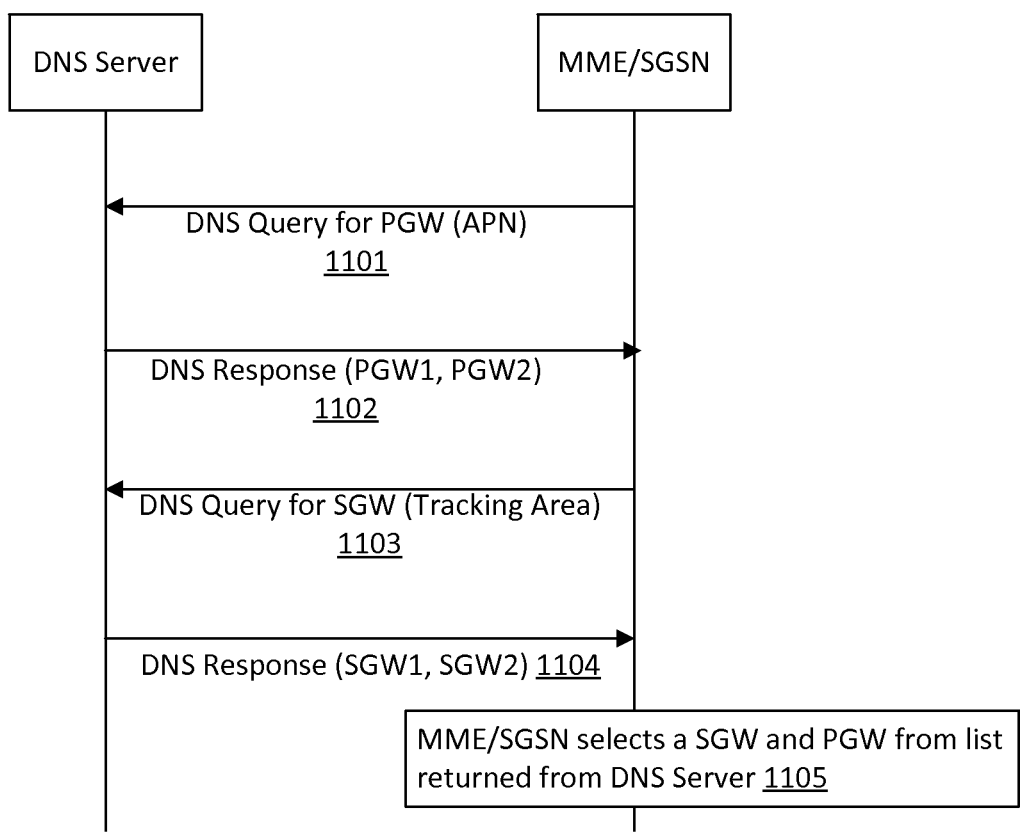
FIG. 11 illustrates an example system flow for FIG. 10, in accordance with an example implementation.

FIG. 11 illustrates an example system flow for FIG. 10, in accordance with an example implementation. To conduct peer node selection for an associated UE, the MME (or SGSN, depending on the desired implementation) submits a DNS Query for a list of peer nodes that are P-GWs for a given access point name (APN) as shown at 1101. At 1102, the DNS Server sends the DNS Response containing P-GWs PGW1 and PGW2. At 1103, the MME/SGSN sends a DNS query for S-GWs based on TA. At 1104, the DNS Response includes S-GWs SGW1 and SGW2. At 1105, the MME/SGSN selects a S-GW and P-GW from the list returned from the DNS Server for the associated UE.

Figure 12:
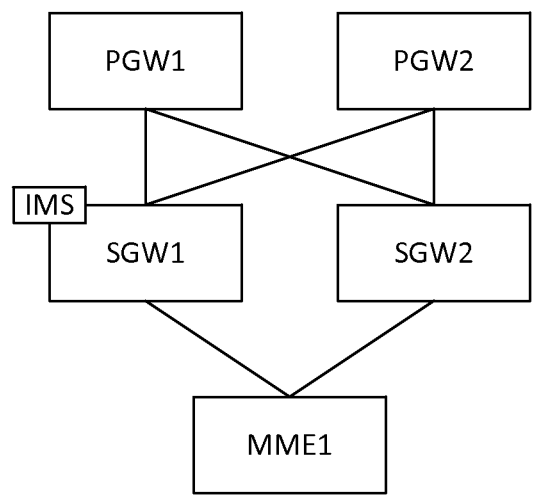
FIG. 12 illustrates an example system, in accordance with an example implementation.

FIG. 12 illustrates an example system, in accordance with an example implementation. In the example system of FIG. 12, an MME (MME1) may be associated with P-GW peer nodes (PGW1, PGW2) and S-GW peer nodes (SGW1, SGW2). In this example, MME1 may need to perform peer node selection for an associated UE, and SGW1 is Internet Protocol Multimedia Subsystem (IMS) capable.

Figure 13:
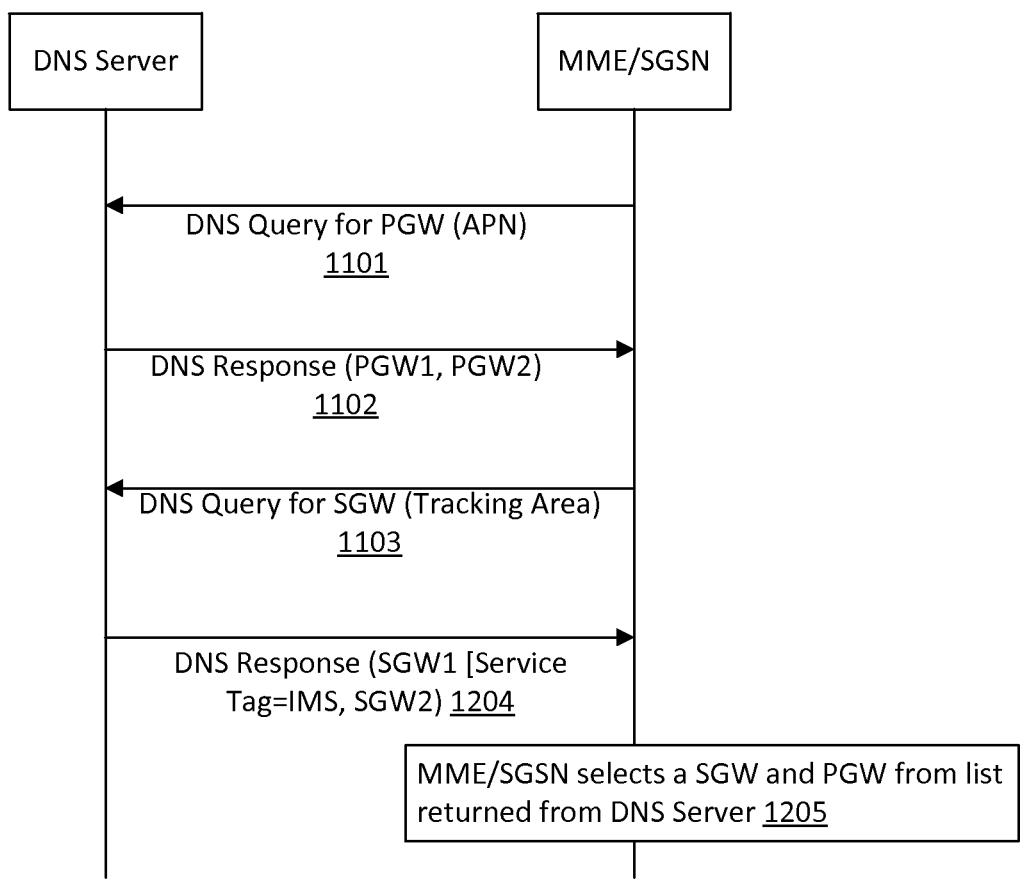
FIG. 13 illustrates an example system flow for FIG. 12, in accordance with an example implementation.

FIG. 13 illustrates an example system flow for FIG. 12, in accordance with an example implementation. The flow is the same as that of FIG. 11, except that the DNS response will have a service tag indicating that SGW1 is IMS capable as indicated at 1204. Thus, when selection is performed at 1205, the MME/SGSN can filter the list for the peer nodes that are IMS capable based on the provided service tag.

Figure 14:
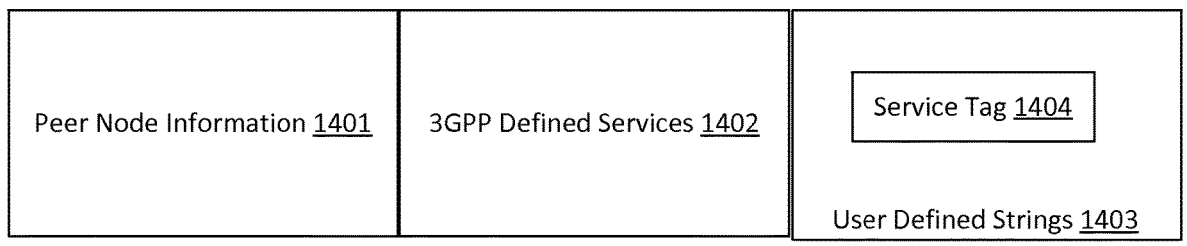
FIG. 14 illustrates an example packet of a DNS response, in accordance with an example implementation.

FIG. 14 illustrates an example packet of a DNS response, in accordance with an example implementation. In an example implementation of a packet for a DNS response, the DNS Server provides a packet including Peer Node Information 1401, 3GPP Defined Services 1402, and one or more User Defined Strings 1403. Peer node Information may include address information of a peer node in response to the query. 3GPP defined services 1402 can include one or more flags to indicate support for 3GPP defined services. User defined strings 1403 can include one or more user strings that the operator of the DNS server wishes to provide. The strings can include the one or more service tags 1404 that indicate the support of services for a peer node that is outside the scope of the 3GPP defined services. Such services can include VoLTE, UE roaming, IMS, and so on, depending on the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. An apparatus, comprising:
a memory configured to store information from one or more Domain Name Service (DNS) responses received in response to a request from a device based on a characteristic of the device, the information comprising a list based on the characteristic,
wherein the list comprises:
a plurality of peer nodes, each of the plurality of peer nodes being associated with one or more service tags, and
the one or more service tags including information indicative of one or more application level capabilities supported by at least a subset of the plurality of peer nodes, the one or more service tags being included in one or more user-defined strings of the one or more DNS responses; and
a processor, configured to:
determine a requested application level capability associated with the request; and
select a peer node from the list if the peer node is associated with a service tag that matches the requested application level capability.

2. The apparatus of claim 1, wherein each of the plurality of peer nodes comprises one or more apparatuses selected from a group consisting of: a PDN Gateway (P-GW), a Serving Gateway (S-GW), a Serving GPRS Support Node (SGSN), a Mobile Switching Center (MSC), a Mobility Management Entity (MME), and a Gateway GPRS Support Node (GGSN).

3. The apparatus of claim 1, wherein the one or more service tags comprise information indicative of identifying a peer node as providing Voice over Long Term Evolution (VoLTE) service.

4. The apparatus of claim 1, wherein the requested application level capability is selected based on a service requested for a User Equipment (UE) associated with the apparatus.

5. The apparatus of claim 1, wherein each of the plurality of peer nodes comprises a PDN Gateway (P-GW) and the characteristic of the device comprises one or more Access Point Names (APNs).

6. The apparatus of claim 1, wherein each of the plurality of peer nodes comprises a Serving Gateway (S-GW) and the characteristic of the device comprises one or more Tracking Areas (TAs).

7. The apparatus of claim 1, wherein the one or more service tags is associated with each of the plurality of peer nodes within the DNS.

8. The apparatus of claim 1, wherein the processor is further configured to refine its selection of a peer node based on a local policy.

9. The apparatus of claim 1, wherein the requested application level capability is associated with the one or more service tags within the DNS.

10. A method, comprising:
storing, by one or more processing devices, information from one or more Domain name service (DNS) responses, received in response to a request from a device based on a characteristic of the device, the information comprising a list based on the characteristic, wherein the list comprises:
a plurality of peer nodes, each of the plurality of peer nodes being associated with one or more service tags, and
the one or more service tags including information indicative of one or more application level capabilities supported by at least a subset of the plurality of peer nodes, the one or more service tags being included in one or more user-defined strings of the one or more DNS responses;
determining, by the one or more processing devices, a requested application level capability associated with the request; and
selecting, by the one or more processing devices, a peer node from the list if the peer node is associated with a service tag that matches the requested application level capability.

11. The method of claim 10, wherein each of the plurality of peer nodes comprises one or more apparatuses selected from a group consisting of: a PDN Gateway (P-GW), a Serving Gateway (S-GW), a Serving GPRS Support Node (SGSN), a Mobile Switching Center (MSC), a Mobility Management Entity (MME), and a Gateway GPRS Support Node (GGSN).

12. The method of claim 10, wherein the one or more service tags comprise information indicative of identifying a peer node as providing Voice over Long Term Evolution (VoLTE) service.

13. The method of claim 10, wherein the requested application level capability is selected based on a service requested from a User Equipment (UE) associated with the apparatus.

14. The method of claim 10, wherein each of the plurality of peer nodes comprises a PDN Gateway (P-GW) and the characteristic of the device comprises one or more Access Point Names (APNs).

15. The method of claim 10, wherein each of the plurality of peer nodes comprises a Serving Gateway (S-GW) and the characteristic of the device comprises one or more Tracking Areas (TAs).

16. A non-transitory computer readable medium storing instructions that, when executed by one or more processing devices, cause the one or more processing devices to perform operations comprising:
storing information from one or more Domain name service (DNS) responses, received in response to a request from a device based on a characteristic of the device, the information comprising a list based on the characteristic, wherein the list comprises:
a plurality of peer nodes, each of the plurality of peer nodes being associated with one or more service tags, and
the one or more service tags including information indicative of one or more application level capabilities supported by at least a subset of the plurality of peer nodes, the one or more service tags being included in one or more user-defined strings of the one or more DNS responses;
determining a requested application level capability associated with the request; and
selecting a peer node from the list if the peer node is associated with a service tag that matches the requested application level capability.

17. The non-transitory computer readable of claim 16, wherein each of the plurality of peer nodes comprises one or more apparatuses selected from a group consisting of: a PDN Gateway (P-GW), a Serving Gateway (S-GW), a Serving GPRS Support Node (SGSN), a Mobile Switching Center (MSC), a Mobility Management Entity (MME), and a Gateway GPRS Support Node (GGSN).

18. The non-transitory computer readable of claim 16, wherein the one or more service tags comprise information indicative of identifying a peer node as providing Voice over Long Term Evolution (VoLTE) service.

19. The non-transitory computer readable of claim 16, wherein the requested application level capability is selected based on a service requested for a User Equipment (UE) associated with the apparatus.

20. The non-transitory computer readable medium of claim 16, wherein each of the plurality of peer nodes comprises a PDN Gateway (P-GW) and the characteristic of the device comprises one or more Access Point Names (APNs).

21. The non-transitory computer readable medium of claim 16, wherein each of the plurality of peer nodes comprises a Serving Gateway (S-GW) and characteristic of the device comprises one or more Tracking Areas (TAs).

* * * * *